United States Patent Office 3,305,547
Patented Feb. 21, 1967

3,305,547
ALKOXYPIPERIDINE DERIVATIVES
AND THEIR SALTS
Kurt Stach and Max Thiel, Mannheim, Friedrich Bickelhaupt, Neckarhausen, near Mannheim, and Wolfgang Schaumann, Mannheim-Waldhof, Germany, assignors to C. F. Boehringer & Soehne G.m.b.H., Mannheim-Waldhof, Germany, a corporation of Germany
No Drawing. Filed Nov. 15, 1962, Ser. No. 238,012
Claims priority, application Germany, Nov. 25, 1961, B 64,932
4 Claims. (Cl. 260—243)

This invention relates to the new alkoxypiperidine derivatives of the formula:

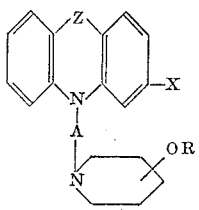

wherein X is hydrogen, halogen, alkyl, alkoxy, alkylmercapto, trifluoromethyl, dialkylamidosulfonyl or acyl, A is an alkylene chain having 2 to 4 carbon atoms, Z is a valence linkage, an oxygen or sulfur atom or a $CH_2$—$CH_2$ or $CH=CH$ bridge, and R is lower alkyl, and their salts.

These new compounds exhibit interesting pharmacological properties and can be used with advantage as medicaments in psychiatric pharmacotherapy because of their psychotropic activity.

Basically substituted phenothiazine derivatives are known (cf., for example, Am. 66, 888 (1944); Helv. Chem. 91, 590 (1960); Swedish Patent 134,621; Belgian Patent 590,443; British Patent 849,137; German "Auslegeschrift" 1,117,584 and 1,049,865, a wide range of therapeutic properties having been disclosed in association therewith. However, the alkoxypiperidine derivatives of the present application are distinguished from the known phenothiazines most structurally similar to those in accordance with the invention, namely those which have an unsubstituted piperidine, piperidone, or piperidinol group in the basic side chains, by a remarkable improvement in sedative effectiveness and/or therapeutic index, especially when a substituent, as for example an acetyl group, is present in the 2-position. Furthermore, the new compounds exhibit neuroleptic activity not shown by the known compounds. No basically substituted phenothiazine derivatives have been described that have the remarkable properties of those of the present invention.

Basically substituted phenoxazine derivatives have been made heretofore (c.f. Belgian Patent 569,697 and British Patent 850,334). Compared with the most similarly structural compounds, i.e. those compounds having an unsubstituted piperidine ring in the side chain, the alkoxypiperidine derivatives in accordance with the invention are distinguished by a significantly superior sedative effectiveness. When a substituent, as for example an acetyl group, is present in the 2-position, a neuroleptic effect is also obtained. The new compounds, in accordance with the invention have surprisingly better chemotherapeutic properties than the previously known compounds, not only as regards the quantitative aspect but in addition the new compounds produce effects that are qualitatively different.

The new alkoxypiperidine derivatives can be produced by the following synthetic routes:

(1) Reaction of a reactive ester of the formula

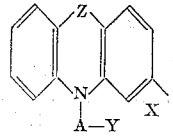

with an alkoxypiperidine wherein A, X and Z have the same meaning as above and Y designates an acid group derived from a strong inorganic or organic acid such as for example hydrohalogenic acids as well as alkyl- and aryl-sulfonic acids. The reaction is advantageously carried out in the presence of a solvent, such as for example acetone or butanone, and in the presence of an acid binding agent such as a strong organic or inorganic base as for example an alkali carbonate.

(2) Condensation of an amine of the formula:

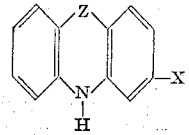

with an alkoxypiperidine derivative of the formula

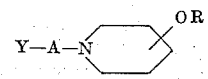

wherein A, R, X, Y, and Z have the meanings as set out above. The amines are preferably reacted in the form of their metal salts, the metal compounds of the phenoxazine and phenothiazines are obtained by a reaction of a phenoxazine or phenothiazine with a metallizing agent, such as for example sodium amide or sodium hydride in an inert solvent as for instance toluene. Thereafter, the metal salt of the amine is reacted with the alkoxypiperidine derivative. The alkoxy piperidine derivative starting materials are obtained for example by reaction of alkoxypiperidines with dihaloalkanes or with haloalkanols, the basic alcohols which are first formed in the latter case are converted by halogenation to the desired basic esters.

(3) Reduction of acid amide derivatives of the formula

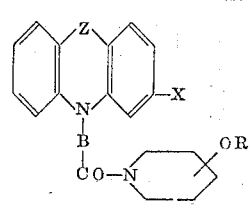

with a reducing agent and preferably with lithium aluminum hydride. In the above formula, R, X and Z have the same meanings as set out above, while B designates an alkylene chain having one less carbon atom than the alkylene chain constituting A. The acid amide starting materials can be obtained by the action of the corresponding acid halides in alkoxypiperidine, or by reacting an amine such as iminodibenzyl or the corresponding N-metallized compound with an acid amide of the formula

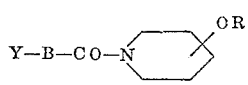

wherein Y, B, and R are as above defined. The acid amides of the just noted formula are obtained, for example by the reaction of halocarbonic acid halide with an alkoxypiperidine.

(4) Etherification of a hydroxypiperidine compound of the formula

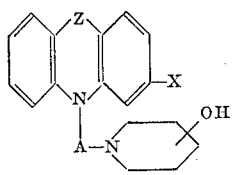

wherein A, X and Z have the same meaning as set out above. The alkylation is preferably carried out with diazoalkanes in a solvent such as, for instance, absolute dioxan or methylene chloride using a catalyst such as a borofluoride etherate or an aluminum alcoholate.

(5) In Z represents an oxygen or sulfur atom, the new compounds can also be obtained by the condensation of diphenyloxide or diphenylsulfide derivatives of the formulae:

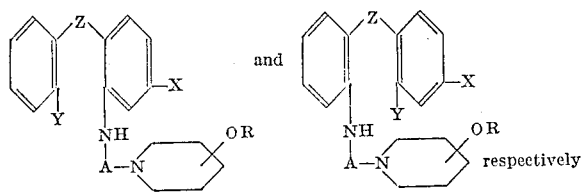

wherein A, R, X, Y, and Z have the meaning as set out above. The ring closing or cyclization reaction is advantageously carried out in the presence of an acid binding condensing agent such as for example an alkali carbonate as for instance sodium bicarbonate, sodium carbonate, or potassium carbonate, and preferably in the presence of a catalytic amount of copper such as copper bronze, copper powder, or a copper salt preferably cupric carbonate.

The starting materials for the ring-closure reaction are obtained from diphenyloxides or diphenylsulfides of the formulae:

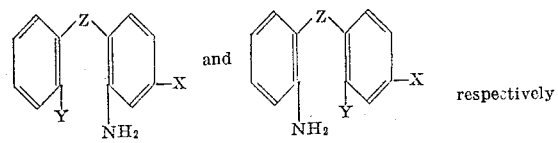

and the basic side chain is added by any of the methods described under 1 to 4 above. The addition of the basic side chain is illustrated by the following:

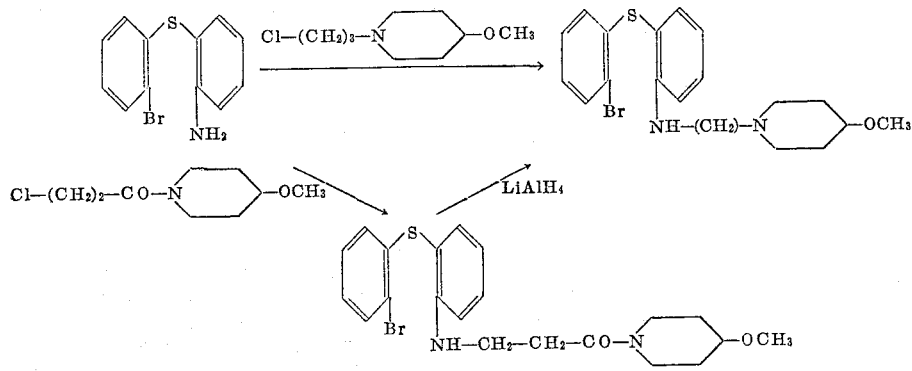

(6) The new compounds can also be prepared in the case wherein Z designates a sulfur atom by the reaction of a diphenylamine derivative of the formula:

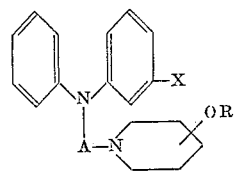

wherein A, R, and X have the meansings as set out above, with sulfur or sulfur chlorides. The diphenylamine derivatives used as starting material are prepared by introducing the basic side chain into the corresponding diphenylamine by any of the methods described under 1–3 as set out above.

The manufacture of the new compounds when X represents acyl is preferably carried out using the corresponding ethylene ketals as starting materials. The desired acyl derivatives are obtained by saponification with dilute mineral acid at the end of the synthesis.

The new alkoxypiperidine derivatives form salts with organic or inorganic acids, such as hydrohalic acids, sulfuric acid, methane sulfonic acid, nitric acid, phosphoric acid, oxalic acid, tartaric acid, citric acid, hydroxyethane sulfonic acid, toluene sulfonic acid, and the like.

Therapeutically useful salts of the new alkoxy piperidine derivatives can be prepared in the customary manner as for example by reaction with acids such as hydrochloric, oxalic, etc.

The present invention in its broadest aspects includes the new alkoxypiperidine derivatives of the formula:

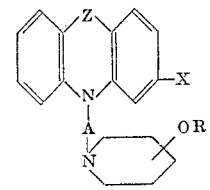

wherein X is hydrogen, halogen, alkyl, alkoxy, alkylmercapto, trifluoromethyl, dialkylamidosulfonyl, or acyl. A is a straight or branched chain alkylene chain having 2 to 4 carbon atoms, Z is a valence linkage, an oxygen or sulfur atom or a $CH_2$—$CH_2$ or $CH$=$CH$ bridge, and R is lower alkyl.

These compounds in which Z is an oxygen atom (phenoxazine) constitute a preferred sub-class as do those compounds in which Z is a sulfur atom (phenothiazines). The phenoxazines constitute new and useful products distinguished by their superior sedative and neuroleptic activity. In a like manner, the phenothiazines constitute compounds having superior and outstanding sedative and neuroleptic effects. Both the phenoxazines and phenothiazines are characterized by diminished toxicity. As acid acceptors in the above set-out reactions, the inorganic and organic bases, such as for example the trialkylamines, pyridenes, etc. and potassium carbonate, sodium carbonate, and sodium bicarbonate have been found suitable.

The reaction, as above set out, may be carried out employing inert solvents or diluents as for example methylene chloride, diphenyl ether, diphenylmethane, paraffin oil, decalin, tetralen, methyl and chloronapthalenes or mixtures of these substances. Alternatively, the reaction may be effected in the absence of a solvent.

The following examples illustrate some preferred as-

EXAMPLE 1

*10-[3-(4-methoxy-piperidyl)-propyl]phenothiazine*

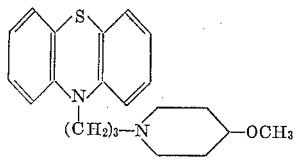

an ethereal diazomethane solution, prepared in the conventional manner from 36 g. nitrosomethylurea there is introduced gradually in portions within a period of 8 hours into a solution of 13 grams of 10-[3-(4-hydroxypiperidyl)-propyl]-phenothiazine prepared by the catalytic reduction of the corresponding piperidone-(4) derivative and 10 grams of aluminum isopropylate in 100 cc. absolute dioxan. After several hours of stirring, the reaction solution is poured into 2 N hydrochloric acid. The layer containing the ether is then discarded, the aqueous phase is alkalinized and extracted with ether. The ether extract is concentrated, taken up in a little ethanol and ethanolic oxalic acid is added to the resulting solution. The insoluble oxalate is recrystallized out of ethanol. 12 g. (70% of theory) 10-[3-(4-methoxy-piperidyl)-propyl]-phenothiazine oxalate, M.P. 185–186° C. are recovered. The base can be prepared from the oxalate in the conventional manner. It can be converted into the hydrochloride by treatment with hydrogen chloride in dioxan. The hydrochloride produced from the base has an M.P. of 157–158° C.

EXAMPLE 2

*2-acetyl-10-[3-(4-methoxy-piperidyl)-propyl]-phenothiazine*

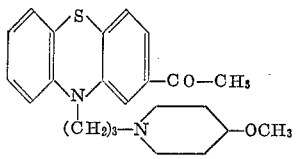

32 grams 2-acetyl-10-(3-chlorpropyl)-phenothiazine-ethyleneketal, 14 grams powdered potassium carbonate, 2 grams sodium iodide and 9 grams 4-methoxy-piperidine (cf. R. R. Renshan & R. C. Corns, J. Amer. Chem. Soc. 60,745/1938) are boiled in 450 ml. diethylketone for 4 hours under reflux. Another 7 grams of potassium carbonate are thereupon added and the mixture is boiled for another 4 hours. The inorganic salts present are then removed by filtering with suction and the filtrate is evaporated to dryness, the residue is dissolved in benzene and extracted with 2 N hydrochloric acid. The HCl extract is washed with benzene, alkalinized with dilute soda lye and the base taken up in benzene. The benzene extract is dried and concentrated by evaporation. The residue is dissolved in ether and the hydrochloride is precipitated with ethereal hydrochloric acid and recrystallized out of isopropanol. 19.2 grams (57% of theory) of 2-acetyl-10-[3-(4-methoxy-piperidyl)-propyl] - phenothiazine hydrochloride, having a melting point of 130° are obtained.

The 2-acetyl-10-(3-chlorpropyl)-phenothiazine - ethylene-ketal used as the starting material is prepared from 2-acetyl-phenothiazine-ethylene-ketal (J. Nakazawa and M. Watatani, Takamine Kenkyusho Nempo 12, 25/1960; cf. Chemical Abstracts 55, 6483/1961) by reaction thereof with 1,3-chloro-bromo-propane and sodium amide in liquid ammonia. The ammonia is evaporated and the residue is extracted with ether and crystallized out of ether and ligroin; M.P. 87° C.

EXAMPLE 3

*10-[3-(4-methoxy-piperidyl)-propyl]-phenoxazine*

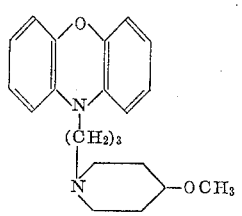

A mixture of 25.9 grams of 10-(3-chlorpropyl)-phenoxazine, 11.5 grams of 4-methoxy-piperidine, 13 grams of potassium carbonate, 1 gram sodium iodide and 250 cc. butanone is boiled for 8 hours under reflux. The reaction mixture is filtered with suction and the filtrate is concentrated using vacuum. The residue is dissolved in dilute hydrochloric acid and extracted with ether. The resulting acid solution is then made alkaline and extracted with methylene chloride. The methylene chloride extract remaining after evaporation can be recrystallized out of isopropanol, resulting in 27 grams (80% of theory) of 10-[3-(4-methoxy-piperidyl)-propyl]-phenoxazine with a melting point of 46–47° C. The hydrochloride melts at 192–193° C.

The 10-(3-chlorpropyl)-phenoxazine used as starting material is prepared by a process analogous to that described for the preparation of phenothiazine by H. Gilman and D. A. Shirley (J. Amer. Chem. Soc. 66, 888, 1944) from phenoxazinyl-(10)-lithium and 3-chlorpropyl-p-toluenesulfonic acid ester.

EXAMPLE 4

*2-methoxy-10-[3-(4-methoxy-piperidyl)-propyl]-phenothiazine*

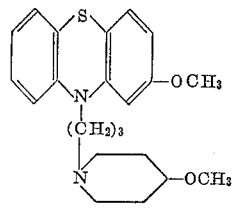

A solution of 23 g. 2-methoxy-phenothiazine in 150 cc. toluene is boiled for 3 hours under reflux with 4 grams of sodium amide. 19 grams of 1-(3-chlor-propyl)-4-methoxy-piperidine are thereafter added and the mixture is boiled under reflux for another 6 hours. The cooled mixture is stirred thoroughly, first with water and then with dilute acetic acid. On alkalinization of the aqueous solution with soda, an oil separates out which is extracted with ether. The ether solution, after drying over potassium carbonate is concentrated and the ether residue is distilled under high vacuum. 23 grams (60% of theory) of 2-methoxy-10-[3 - (4 - methoxy-piperidinyl) - propyl]-phenothiazine having a B.P.$_{0.1}$ of 230–240° C. are recovered. The 1 - (3-chlor-propyl)-4-methoxy-piperidine used as starting material is prepared as follows: 1-(3-hydroxypropyl)-4-methoxy-piperidine (B.P.$_{0.2}$ 85–88° C.) is first prepared by reacting 4-methoxy-piperidine with 3-chlorpropanol in the presence of potassium carbonate and butanone. The reaction product thereby obtained is reacted with thionyl chloride in chloroform and 1-(3-chlorpropyl)-4-methoxy-piperidine is obtained having a B.P.$_{13}$ of 123–126° C.

EXAMPLE 5

*2-acetyl-10-[3-(4-methoxy-piperidyl)-propyl] phenoxazine*

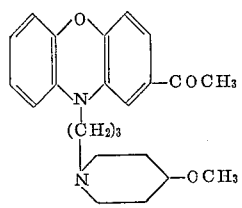

A mixture of 34.6 g. 2-acetyl-10-(3-chlorpropyl)-phenoxazine-ethyleneketal, 12 g. 4-methoxy-piperidine, 14 g. potassium carbonate, 0.5 g. sodium iodide and 350 cc. butanone is boiled for 10 hours under reflux. The reaction mixture is suction filtered and washed with butanone, and the combined filtrates concentrated. The concentrate is recrystallized out of isopropanol and 33 grams (78% of theory of 2-acetyl-10-[3-(4-methoxy-piperidyl)-propyl]-phenoxazine-ethylene-ketal having a melting point of 102–103° C. are obtained. The recovered ketal is dissolved in dilute hydrochloric acid and allowed to stand for 2 hours at about 50° C. in order for saponification to take place. The resulting acid solution is alkalinized and extracted with ether.

Ethereal hydrochloric acid is added with agitation to the dried ether extract, whereupon a yellowish hydrochloride precipitate is formed. The yield of 2-acetyl-10-[3-(4-methoxy-piperidyl)-propyl]-phenoxazine hydrochloride having a melting point of 179–180° C. amounts to 29 grams (70% of theory).

The 2-acetyl-10-(3-chlorpropyl)-phenoxazine-ethyleneketal used as starting material is obtained in the following manner: 2-acetyl-phenoxazine-ethyleneketal (Vanderhaeghe, J. Org. Chem. 25, 747/1960) is treated with 1,3-chlorobromo-propane in liquid ammonia and in the presence of sodium amide. Ether is added, the ammonia is evaporated off, and the ethereal layer is separated and concentrated. The ether concentrate is dissolved in benzene. A dark grease is precipitated with ligroin and the solution is again concentrated. The concentrate is made to crystallize by treatment thereof with ether. The yield of 2-acetyl-10-(3-chlorpropyl)-phenoxazine-ethylene-ketal having a melting point of 85–86° C. amounts to 55% of theory.

EXAMPLE 6

*9-[3-(4-methoxy-piperidyl)-propyl]-carbazole*

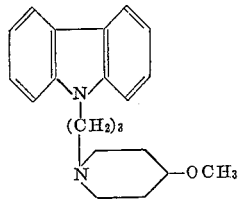

A mixture of 17 g. 9-(3-chlorpropyl)-carbazole, 8 g. 4-methoxy-piperidine, 9 g. potassium carbonate, 0.5 g. sodium iodide and 180 cc. butanone is boiled for 8 hours under reflux. The mixture is suction filtered, the residue dissolved in ether and extracted with dilute hydrochloric acid. The resulting acid solution is alkalinized and extracted with methylene chloride. The concentrated methylene chloride extract is recrystallized out of isopropanol. The yield of 9-[3-(4-methoxy-piperidyl)-propyl]-carbazole having a melting point of 95–96° C. amounts to 18 grams (80% of theory).

The 9-(3-chlorpropyl)-carbazole used as starting material is prepared from carbazolyl-(9)-lithium and trimethylene-chlorohydrin-p-toluenesulfonic acid ester according to the method described by Gilman & Shirley (J. Amer. Chem. Soc. 66, 888, 1944) and has a melting point of 37–38° C.

EXAMPLE 7

*5-[3-(4-methoxy-piperidyl)-propyl]-iminodibenzyl*

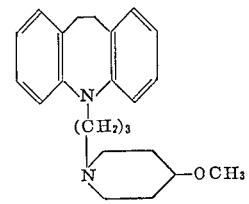

A methylene chloride extract is produced by a procedure similar to that described in Example 6 above from 27 grams 5-(3-chlorpropyl)-iminodibenzyl, 11.5 g. 4-methoxy-piperidine, 14 g. potassium carbonate, 1 g. sodium iodide and 280 cc. butanone. An extract is obtained as set out in Example 6 which is dissolved in isopropanol and neutralized with ethereal hydrochloric acid. The hydrochloride crystallizes upon cooling. The yield of 5-[3 - (4 - methoxy-piperidyl)-propyl]-iminodibenzyl hydrochloride, M.P. 170–171° C. recovered amounts to 25 grams (65% of theory).

The 5-(3-chlorpropyl)-iminodibenzyl used as starting material is prepared from iminodibenzyl-(5)-lithium and trimethylene-chlorhydrine-p-toluene-sulfonic acid ester according to the method described by Gilman and Shirley (cf. Example 6); B.P.$_{0.3}$ 185–190° C.

EXAMPLE 8

*2-chloro-10-[3-(4-methoxy-piperidyl)-propyl]-phenothiazine*

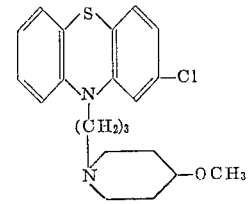

A methylene chloride extract is prepared from 31 g. 2-chloro-10-(3-chlorpropyl)-phenothiazine, 11.5 g. 4-methoxy-piperidine, 14 g. potassium carbonate, 1 g. sodium iodide and 280 cc. butanone in a manner similar to that described in Example 6 above. The concentrate thereof is distilled under high vacuum. The yield of 2-chloro-10-[3 - (4 - methoxy - piperidyl)-propyl]-phenothiazine B.P. $_{0.09}$ 230–235° C. amounts to 33 g. (85% of theory).

EXAMPLE 9

*9-[3-(4-methoxy-piperidyl)-propyl]-carbazole*

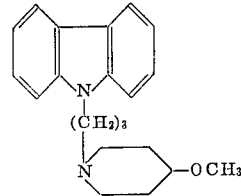

17 grams of 1-[3-(carbazolyl-9)-propionyl]-4-methoxy-piperidine in 100 cc. tetrahydrofuran are added drop-wise, with agitation, to a suspension of 2 g. lithium aluminum hydride in 70 cc. tetrahydrofuran. After 2 hours of heating at 50° C., the mixture is cooled and about 10 cc. water are added. The reaction mixture is filtered by suction and washed with tetrahydrofuran. The combined filtrates are concentrated using vacuum and the concentrate is recrystallized out of isopropanol. The yield of 9 - [3 - (4-methoxy-piperidyl)-propyl]-carbazole, M.P. 95–96° C. amounts to 13 g. (80% of theory).

EXAMPLE 10

10-[3-(4-ethoxy-piperidyl)-propyl]-phenothiazine

A mixture of 16 grams 10-(3-chlorpropyl)-phenothiazine, 7 g. potassium carbonate, 0.5 g. sodium iodide, 6.5 g. 4-ethoxy-piperidine and 150 cc. butanone is processed as set out in Example 6. The concentrated methylene chloride extract is dissolved in isopropanol and neutralized with ethereal hydrochloric acid. The crystals are separated by suction filtering after cooling. The yield of 10-[3-(4-ethoxy-piperidyl)-propyl]-phenothiazine hydrochloride, M.P. 156–157° C. amounts to 21 g. (87% of theory).

EXAMPLE 11

10-[3-(ethoxy-piperidyl)-propyl]-phenoxazine 18 g. phenoxazine and 3.9 g. sodium amide are boiled in 180 cc. toluene for 3 hours under reflux. 20 g. 1-(3-chlorpropyl)-4-ethoxy-piperidine are then added and the mixture is boiled for another 8 hours. The mixture is cooled. About 100 cc. water are added, and the mixture then thoroughly stirred. The toluene layer is separated and extracted with dilute acetic acid. The acid phase is alkalinized and extracted with ether, and the ether extract is dried and concentrated by evaporation. The concentrate is treated with ligroin-isopropanol (1:1) and allowed to stand for a while and then suction filtered. The yield of 10-[3-ethoxy-piperidlyl)-propyl]-phenoxazine, M.P. 59–60° C. Hydrochloride: M.P. 199–200° C. (isopropanol) amounts to 21 g. (61% of theory).

The 1-(3-chlorpropyl)-4-ethoxy-piperidine required as starting material is obtained in the following manner: 1-(3-hydroxy-propyl)-4-ethoxy-piperidine (B. P.$_{14}$ 136–1-(3-hydroxy-propyl)-4-ethoxy-piperidine (B.P.$_{14}$ 136–138° C.) is first prepared by reacting 4-ethoxy-piperidine with 3-chlorpropanol in the presence of potassium carbonate and butanone and reacting the product thereby formed with thionyl chloride in benzene. The 1-(3-chlorpropyl)-4-ethoxy-piperidine hydrochloride having a melting point of 177–178° C. thereby obtained can be converted into the base in the usual manner (B.P.$_{18}$ 130–132° C.).

EXAMPLE 12

2-acetyl-10-[3-(4-ethoxy-piperidyl)-propyl]-phenoxazine

A mixture of 25 g. 2-acetyl-10-(3-chlorpropyl)-phenoxazine-ethyleneketal (cf. Example 5), 10 g. potassium carbonate, 0.5 g. sodium iodide, 250 cc. butanone and 9.5 g. 4-ethoxy-piperidine is treated as in Example 5. First there is obtained 24 g. of 2-acetyl-10-[3-(4-ethoxy-piperidyl)-propyl]-phenoxazine ethyleneketal having a M.P. 87–88° C., which is dissolved in 100 cc. 1 N hydrochloric acid and allowed to stand for 1 hour. The acid mixture is then alkalinized and extracted with ether. The concentrate obtained by evaporating the ether extract crystallizes when treated with ether. The yield of 2-acetyl-10-[3-(4-ethoxy-piperidyl)-propyl]-phenoxazine, M.P. 72° C. Hydrochloride: M.P. 209–210° C. (isopropanol) amounts to 20 g. (70% of theory).

EXAMPLE 13

10-[3-(4-methoxy-piperidyl)-propyl]-phenoxazine

An ethereal solution of diazomethane, produced in the conventional manner from 36 grams nitrosomethylurea, is added in portions over a period of 8 hours to a solution of 12.5 g. 10-[3-(4-hydroxy-piperidyl)-propyl]-phenoxazine and 10 g. aluminum isopropylate in 100 cc. absolute dioxan. After stirring for several hours, the solution is poured into 2 N hydrochloric acid, the ethereal layer discarded, and the aqueous phase made alkaline and extracted with ether. The concentrate of the ether extract is recrystallized out of isopropanol and 7.7 grams of 10-[3-(4-methoxy-piperidyl)-propyl]-phenoxazine having a melting point of 47° C. Hydrochloride: M.P. 192–193° C. (59% of theory) are obtained.

10-[3-(4-hydroxy-piperidyl)-propyl]-phenoxazine M.P. 95° C. is obtained by the catalytic hydration (Raney nickel in methanol) of 10-[3-(4-oxopiperidyl)-propyl]-phenoxazine.

EXAMPLE 14

10-[3-(4-isopropoxy-piperidyl)-propyl] phenothiazine

A mixture of 14 g. 10-(3-chlorpropyl)-phenothiazine, 7 g. potassium carbonate, 0.5 g. sodium iodide, 7 g. 4-isopropoxy-piperidine and 150 cc. butanone is treated by the process as set out in Example 6. The concentrate of methylene chloride extract is dissolved in dioxane and neutralized with ethereal hydrochloric acid. After cooling, the crystals are suction filtered. The yield of 10-[3-(4-isopropoxy-piperidyl)-propyl]-phenothiazine hydrochloride, M.P. 155–157° C. amounts to 14.7 g. (74% of theory).

EXAMPLE 15

2-acetyl-10-[3-(4-ethoxy-piperidyl)-propyl]-phenothiazine

A mixture of 18.2 g. 2-acetyl-10-(3-chlorpropyl)-phenothiazine-ethylene ketal, 6.5 g. 4-ethoxy-piperidine, 8 g. potassium carbonate, 1 g. sodium iodide and 200 ml. diethylketone is treated and processed as set out in Example 2. The base obtained after the usual purification process is distilled under high vacuum. The yield of 2 - acetyl - 10 - [3 - (4 - ethoxy - piperidyl) - propyl]-phenothiazine having a B.P. of 233–240° C./10$^{-5}$ mm. Hg amounts to 11 g. (54% of theory).

EXAMPLE 16

10-[3-(4-n-propoxy-piperidyl)-propyl]-phenothiazine 20 g. phenothiazine are boiled under reflux with 8 g. sodium amide in 200 cc. toluene for 3 hours. 26 g. 1-(3-chlorpropyl)-4-n-propoxy-piperidine hydrochloride are then added and the mixture is boiled for a further 8 hours under reflux. About 100 cc. water are added to the mixture. The toluene layer is separated off and extracted with dilute acetic acid. The acid solution is alkalinized, extracted with ether, the ether extract is dried and concentrated by evaporation. After drying, under higher vacuum, at about 100° C., the residue is dissolved in isopropanol and neutralized with ethereal hydrochloric acid. Ether is added to the solution until turbidity sets in and therewith crystallization. The yield amounts to 25 g. (60% of theory) of 10-[3-(4-n-propoxy-piperidyl)-propyl]-phenothiazine hydrochloride with a melting point of 157–158° C.

The 1-(3-chlorpropyl)-4-n-propoxy-piperidine hydrochloride having a melting point of 187–188° C., used as starting material, is obtained from 4-n-propoxy-piperidine in a manner analogous to that described in Example 4.

The end products of this process may be combined with a pharmaceutical carrier for administration to humans in an amount to attain the desired pharmaco-dynamic effect. Such carriers are either solid or liquid. Exemplary of solid pharmaceutical carriers are lactose, corn starch, manitol, talc, etc. The compounds of this invention are mixed with the carrier and built into hard-gelatin capsules or tableted with suitable tableting aids, such as magnesium stearate, starch, or other lubricants, disintegrants, or coloring agents. If combination with a liquid carrier is desirable, a soft gelatin capsule is filled with a slurry of the novel compounds in soy bean or peanut oil. Aqueous suspensions or solutions are prepared for alternate oral or parenteral administration.

Compounds falling within the scope of the invention were compared for therapeutic activity, i.e. pharmacological effect and toxicity with known phenothiazines and phenoxazines of closely analogous structure.

The comparative tests which were carried out included the following:

(1) *Toxicity.*—Determination of the $LD_{50}$ in mice (in mg./kg., subcutaneous).

(2) *Hypnotic Potentiation of Urethane (HPU).*—Determination of the $ED_{50}HPU$ in mice (in mg./kg., subcutaneous).

The HPU test applied to the sedative components. The animals first received the substance being tested and 15 minutes later, one gram per kilogram of urethane administered intraperitoneally. The latter constitutes a subhypnotic dose which causes the animals merely to assume a recumbent or lying down position. The effect of the urethane becomes apparent 15 to 30 minutes after injection. The doses of test substance were determined which caused 50% of the animals to assume the recumbent or supine position.

(3) *Therapeutic Index.* — The therapeutic index ($ED_{50}HPU/LD_{50}$) is the ratio of the effective HPU dose to the toxicity, or, in the present case, the $ED_{50}HPU$ as a percentage of the $LD_{50}$. The lower the quotient is, the greater is the therapeutic index.

(4) *Inhibition of Secondarily Conditioned Reactions (SCR).*—Determination of the $ED_{50}SCR$ for rats (mg./kg., subcut.).

Mafiil's method was used (Journal of Pharm. and Pharmacol., 11, 129/1959). In accordance with the method described therein, rats were trained to respond to a buzzer sound combined with a shock by fleeing from a dark part of the cage to a lighter part. Later on, the buzzer tone alone sufficed to produce the reaction (conditioned reaction or "CR"), and finally the stimulus of the cage alone (the environment) sufficed to make the rats flee (secondary conditioned reaction or "SCR"). In the experiments the inhibition of the SCR was evaluated, that is, the dose determined which inhibited the SCR in 50% of the rats.

The SCR inhibition serves as a measure of the suppression of emotions and impulses on which the effectiveness of the substance in the treatment of psychoses is based, i.e., it is used to determine the neuroleptic effect of the compound.

The following compounds in accordance with the invention were subjected to the comparative tests:

10-[3-(4-methoxy-piperidyl)-propyl]-phenothiazine
10-[3-(4-ethoxy-piperidyl)-propyl]-phenothiazine
2-acetyl-10-[3-(4-methoxy-piperidyl)-propyl]-phenothiazine
2-acetyl-10-[3-(4-ethoxy-piperidyl)-propyl]-phenothiazine
2-methoxy-10-[3-(4-methoxy-piperidyl)-propyl]-phenothiazine
10-[3-(4-ethoxy-piperidyl)-propyl]-phenoxazine
2-acetyl-10-[3-(4-methoxy-piperidyl)-propyl]-phenoxazine.

In addition, compounds as disclosed in Belgian Patent 569,697, British Patent 850,334, Belgian Patent 590,443, British Patent 849,137, and German "Auslegeschrift 1,117,584 were tested:

The results of these comparative tests and the structural relationship of the compounds tested can be seen from the following tables:

TABLE 1

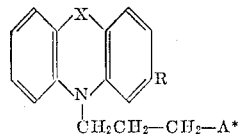

$CH_2CH_2-CH_2-A^*$

| No. | R | A | $LD_{50}$ | $ED_{50}$ (HPU) | $\frac{ED_{50}(HPU \times 100)}{LD_{50}}$ | $ED_{50}$ (SCR) | Source |
|---|---|---|---|---|---|---|---|
| 1 | H | N⟩ | 1,800 | 5.0 | 0.40 | >160 | Gilman & Shirley, Am. 66,888 (1944), Hromatka u. Mit., Helv. Chem. 91,590 (1960), Schwed. P. 134 621 (C.A. 48, 107830/1954). |
| 2 | H | N⟩=O | 620 | 4.3 | 0.70 | 23.0 | Belgian Patent 590,443. |
| 3 | H | N⟩-OH | 180 | 3.4 | 1.90 | 13.5 | Brit. 849,137/Auslegeschrift 1,117,584. |
| 4 | H | N⟩-OCH₃ | 1,350 | 3.5 | 0.30 | 55.0 | Example 1. |
| 5 | H | N⟩-OC₂H₅ | 2,000 | 2.80 | 0.14 | 21.0 | Example 10. |
| 6 | COCH₃ | N⟩ | 820 | 0.37 | 0.05 | 5.20 | Auslegeschrift 1,049,865. |
| 7 | COCH₃ | N⟩-OH | 470 | 0.42 | 0.09 | 2.10 | Auslegeschrift 1,117,584. |
| 8 | COCH₃ | N⟩-OCH₃ | 2,000 | 0.14 | 0.007 | 1.85 | Example 2. |
| 9 | COCH₃ | N⟩-OC₂H₅ | 2,000 | 0.42 | 0.02 | 0.9 | Example 15. |
| 10 | OCH₃ | N⟩-OH | 560 | 0.42 | 0.08 | 2.0 | Auslegeschrift 1,117,584, British Patent 849,137. |
| 11 | —OCH₃ | N⟩-OCH₃ | 1,170 | 0.39 | 0.03 | 1.7 | Example 4. |

TABLE 1—Continued

| No. | R | A | $LD_{50}$ | $ED_{50}$ (HPU) | $\frac{ED_{50}(HPU \times 100)}{LD_{50}}$ | $ED_{50}$ (SCR) | Source |
|---|---|---|---|---|---|---|---|
| 12 | H | N⟩ | 930 | 22 | 2.4 | φ | Belgian Pat. 569,697. |
| 13 | H | N⟩—OC₂H₅ | 2,000 | 15.2 | 0.75 | φ | Example 11. |
| 14 | COCH₃ | N⟩ | 475 | 5.9 | 1.2 | φ | British Patent 850,334. |
| 15 | COCH₃ | N⟩—OCH₃ | 900 | 1.2 | 0.1 | 20.0 | Example 5. |

*Examples 1–11—X=S. Examples 12–15—X=O.

As can be seen from the above table, a substantial increase in sedative effectiveness is achieved by the introduction of an alkoxy group into the piperidine ring of basically substituted phenoxazine derivatives. When a substituent (as for example an acetyl group) is simultaneously present in the 2-position, a neuroleptic effect is manifested. The new phenoxazine compounds, therefore, are not merely quantitatively better than those of the prior art, but to a considerable extent they are characterized by a qualitative difference in their overall effects.

The table also clearly shows that the phenothiazine derivatives characterized by alkoxy-piperidine moieties in the basic side chains have improved sedative effectiveness and/or therapeutic indices in comparison to the corresponding piperidine, piperidone-(4), and piperidinol-(4) compounds of the prior art. This increase in effectiveness and significantly improved therapeutic index is most apparent when there is a substituent present, as for example an acetyl group in the 2-position. Furthermore, the new compounds are characterized by an increased neuroleptic effectiveness.

What is claimed is:

1. 2 - acetyl - 10 - [3 - (4 - methoxy - piperidyl)-propyl]-phenothiazine.
2. 2 - acetyl - 10 - [3 - (4 - ethoxy - piperidyl)-propyl]-phenothiazine.
3. 2 - methoxy - 10 - [3 - (4 - methoxy - piperidyl)-propyl]-phenothiazine.
4. 2 - acetyl - 10 - [3 - (4 - methoxy - piperidyl)-propyl]-phenoxazine.

References Cited by the Examiner

UNITED STATES PATENTS

| | | | |
|---|---|---|---|
| 2,485,212 | 10/1949 | Miescher et al. | 260—243 |
| 2,687,414 | 8/1954 | Cusic | 260—243 |
| 2,928,767 | 3/1960 | Gulesich et al. | 260—243 X |
| 2,931,810 | 4/1960 | Yale et al. | 260—243 |
| 2,947,745 | 8/1960 | Craig | 260—244 |
| 2,997,468 | 8/1961 | Schwartz | 260—243 |
| 3,023,146 | 2/1962 | Tislow et al. | 167—244 |
| 3,075,976 | 1/1963 | Jacob et al. | 260—243 |
| 3,094,526 | 6/1963 | Zenitz et al. | 260—243 |

FOREIGN PATENTS

| | | |
|---|---|---|
| 221,342 | 4/1959 | Australia. |
| 849,137 | 9/1960 | Great Britain. |
| 875,602 | 8/1961 | Great Britain. |

OTHER REFERENCES

Craig et al.: J. Org. Chem., vol. 26, pp. 135–138, January 1961.

Webster: Brit. J. Pharmacol., vol. 17, pp. 507–518 (1961).

JOHN D. RANDOLPH, *Primary Examiner.*